(12) United States Patent
Stephenne et al.

(10) Patent No.: US 10,334,589 B2
(45) Date of Patent: Jun. 25, 2019

(54) COEXISTENCE OF DELAY-TOLERANT AND DELAY-SENSITIVE SESSIONS

(71) Applicant: Telefonaktiebolaget LM Ericsson (publ), Stockholm (SE)

(72) Inventors: Alex Stephenne, Stittsville (CA); Jagadish Ghimire, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 363 days.

(21) Appl. No.: 15/105,659

(22) PCT Filed: Apr. 14, 2016

(86) PCT No.: PCT/IB2016/052141
§ 371 (c)(1),
(2) Date: Jun. 17, 2016

(87) PCT Pub. No.: WO2017/141082
PCT Pub. Date: Aug. 24, 2017

(65) Prior Publication Data
US 2018/0167938 A1    Jun. 14, 2018

Related U.S. Application Data

(60) Provisional application No. 62/296,937, filed on Feb. 18, 2016.

(51) Int. Cl.
*H04L 1/00* (2006.01)
*H04W 4/70* (2018.01)
(Continued)

(52) U.S. Cl.
CPC ....... *H04W 72/0446* (2013.01); *H04L 1/0068* (2013.01); *H04W 28/0215* (2013.01);
(Continued)

(58) Field of Classification Search
CPC ......... H04W 72/0446; H04W 72/1247; H04W 28/0215; H04W 4/70; H04W 72/1242; H04L 1/0068; H04L 47/24
(Continued)

(56) References Cited

U.S. PATENT DOCUMENTS

2011/0252139 A1* 10/2011 Bhattad ................ H04L 1/0013
                                                       709/226
2011/0310986 A1* 12/2011 Heo ........................ H04L 5/001
                                                       375/259

(Continued)

FOREIGN PATENT DOCUMENTS

EP        2882249 A1     6/2015
WO     2016003334 A1     1/2016

OTHER PUBLICATIONS

International Search Report and Written Opinion for International Patent Application No. PCT/IB2016/052141, dated Jun. 29, 2016, 13 pages.

*Primary Examiner* — Brian T O Connor
(74) *Attorney, Agent, or Firm* — Withrow & Terranova, PLLC

(57) ABSTRACT

A method of operation of a scheduler implemented in a network node of a cellular communications system comprises scheduling one or more delay-tolerant transmissions by one or more respective wireless devices in a subframe. Scheduling the one or more delay-tolerant transmissions by the one or more respective wireless devices comprises, for each wireless device: identifying a plurality of available resources in a subframe; for each available resource of the plurality of available resources in the subframe, determining one or more link adaptation parameters for the wireless device for the available resource based on information representing a statistical model of predicted puncturing of delay-tolerant transmissions using the available resource in
(Continued)

order to enable transmission of delay-sensitive transmissions; and selecting one of the plurality of available resources in the subframe for the delay-tolerant transmission of the wireless device based on at least one of the one or more link adaptation parameters.

34 Claims, 10 Drawing Sheets

(51) Int. Cl.
  *H04W 28/02* (2009.01)
  *H04W 72/04* (2009.01)
  *H04W 72/12* (2009.01)
  *H04L 12/851* (2013.01)

(52) U.S. Cl.
  CPC ... *H04W 72/1242* (2013.01); *H04W 72/1247* (2013.01); *H04L 47/24* (2013.01); *H04W 4/70* (2018.02)

(58) Field of Classification Search
  USPC .......................................................... 370/329
  See application file for complete search history.

(56) References Cited

U.S. PATENT DOCUMENTS

| | | | |
|---|---|---|---|
| 2013/0225220 A1* | 8/2013 | Dotzler | H04W 72/1226 455/509 |
| 2016/0037379 A1 | 2/2016 | Shafiee et al. | |
| 2016/0234857 A1* | 8/2016 | Chen | H04W 72/1231 |
| 2017/0223687 A1* | 8/2017 | Kuchibhotla | H04W 72/044 |

* cited by examiner

*Illustration of the concept of puncturing probability matrix*

COEXISTENCE OF DELAY-TOLERANT AND DELAY-SENSITIVE SESSIONS

RELATED APPLICATIONS

This application is a 35 U.S.C. § 371 national phase filing of International Application No. PCT/IB2016/052141, filed Apr. 14, 2016, which claims the benefit of U.S. Provisional Application No. 62/296,937, filed Feb. 18, 2016, the disclosures of which are incorporated herein by reference in their entireties.

TECHNICAL FIELD

This disclosure relates to Machine-Type Communication (MTC) and particularly to enabling the coexistence of delay-tolerant and delay-sensitive sessions over MTC.

BACKGROUND

Different services can be offered through a given physical wireless network. Those services might have totally different requirements. For example, remote control of manufacturing machines in hazardous environment might be associated with relatively small information payload, but the information needs to be received extremely reliably and with ultra-low latency. This type of service is associated with what is called Critical Machine-Type Communication (C-MTC). The same physical network might also support massive connectivity of devices such as a carpet cleanliness sensor in some rooms of a basement. Clearly, communication of the sensor information is not delay-sensitive and falls in the Massive MTC (M-MTC) family, not the C-MTC family. Still, both services could be offered through the same physical network using a set of physical resources. Clearly, one would like to ensure the high reliability of the C-MTC communication while being able to support M-MTC. An approach envisioned is to set aside and reserve some frequency resources, which would be exclusively available to the C-MTC service, to be able to fully control availability of resources for the C-MTC service. This approach is often called hard-slicing (of the frequency domain, in this example).

Doing hard-slicing nevertheless has some disadvantages. For example, it reduces the joint (combined C-MTC and other service types) achievable system capacity. Ultimately, what one would like to do is fully share resources and efficiently manage the service prioritization while guaranteeing some level of fairness, as may be described in a properly prepared service-level agreement. That way, if the system is under loaded by all service types, the resource sharing would fall back to hard-slicing, but when the system is overloaded, all system resources could be accessible by any service type. Access to all resources by all services is referred to herein as soft-slicing.

Doing soft-slicing is not straightforward. M-MTC communications can effectively use relatively long transmission intervals because of repetition to enhance coverage (i.e., multiple repetitions result in an effective transmission interval that is long as compared to a typical transmission interval when not using repetitions), while C-MTC communications can typically use very short transmission intervals because of the time criticality of the communications. Therefore, if M-MTC transmissions are scheduled over most of the frequency resources, they could actually make resources unavailable for an unacceptably long duration for some C-MTC sessions which need short duration but immediate resource access. Guaranteeing a certain level of quality of service for C-MTC traffic under such soft-slicing approach is then very difficult.

Accordingly, there is a need for methods for improved coexistence of delay-tolerant and delay-sensitive sessions.

SUMMARY

According to an aspect of the subject matter described herein, a method of operation of a scheduler implemented in a network node of a cellular communications system is provided. In one embodiment, the method comprises scheduling one or more delay-tolerant transmissions by one or more respective wireless devices in a subframe. Scheduling the one or more delay-tolerant transmissions by the one or more respective wireless devices comprises, for each wireless device: identifying a plurality of available resources in a subframe, and, for each available resource of the plurality of available resources in the subframe, determining one or more link adaptation parameters for the wireless device for the available resource based on information representing predicted puncturing of delay-tolerant transmissions using the available resource in order to enable transmission of delay-sensitive transmissions. In one embodiment, the method further comprises selecting one of the plurality of available resources in the subframe for the delay-tolerant transmission of the wireless device based on at least one of the one or more link adaptation parameters.

In one embodiment, the method further comprises scheduling one or more delay-sensitive transmissions by one or more respective wireless devices in the subframe. In one embodiment, the plurality of available resources for scheduling the plurality of delay-tolerant transmissions does not include resources on which the delay-sensitive transmissions are scheduled in the subframe. In one embodiment, scheduling the one or more delay-sensitive transmissions in the subframe comprises, for each delay-sensitive transmission to be scheduled in the subframe, determining whether there are any unused resources in the subframe, and if there are unused resources in the subframe, selecting an unused resource as a resource for the delay-sensitive transmission by the respective wireless device. If there are no unused resources in the sub frame, a resource already assigned to a delay-tolerant transmission is selected as the resource for the delay-sensitive transmission. In one embodiment, selecting the resource already assigned to a delay-tolerant transmission as the resource for the delay-sensitive transmission comprises selecting one of a plurality of resources in the subframe that are already assigned to delay-tolerant transmissions as the resource for the delay-sensitive transmission based on a predefined criteria.

In one embodiment, the method further comprises determining whether a puncturing level for a resource in the subframe that is assigned to a delay-tolerant transmission is greater than a predefined threshold, and if so, cancelling the delay-tolerant transmission.

According to another aspect of the subject matter described herein, a radio node for a cellular communications network is provided. In one embodiment, the radio node comprises one or more transmitters, one or more receivers, one or more processors, and memory storing instructions executable by the one or more processors. The radio node is operable to schedule one or more delay-tolerant transmissions by one or more respective wireless devices in a subframe. The scheduling comprises, for each wireless device, identifying a plurality of available resources in the subframe, and, for each available resource of the identified plurality of available resources, determining one or more link adaptation parameters for the wireless device based on information representing a predicted puncturing of delay-tolerant transmissions using the available resource in order to enable transmission of delay-sensitive transmissions.

In one embodiment, the radio node is, via execution of instructions by the one or more processors, further operable to select one of the identified plurality of available resources in the subframe for the delay-tolerant transmission of the wireless device based on at least one of the determined one or more link adaptation parameters. In one embodiment, the radio node is, via execution of instructions by the one or more processors, further operable to schedule one or more delay-sensitive transmissions by the one or more respective wireless devices in the subframe. In one embodiment, the plurality of available resources for scheduling the plurality of delay-tolerant transmissions does not include resources on which the delay-sensitive transmissions are scheduled in the subframe.

In one embodiment, scheduling the one or more delay-sensitive transmissions in the subframe comprises, for each delay-sensitive transmission to be scheduled in the subframe, determining whether there are any unused resources in the subframe. If there are unused resources in the subframe, the radio node selects an unused resource as a resource for the delay-sensitive transmission by the respective wireless device. If there are no unused resources in the subframe, the radio node selects a resource already assigned to a delay-tolerant transmission as the resource for the delay-sensitive transmission.

In one embodiment, selecting the resource already assigned to the delay-tolerant transmission as the resource for the delay-sensitive transmission comprises selecting one of a plurality of resources in the subframe that are already assigned to delay-tolerant transmissions as the resource for the delay-sensitive transmission based on a predefined criteria.

In one embodiment, the radio node is, via execution of instructions by the one or more processors, further operable to determine whether a puncturing level for a resource in the subframe that is assigned to a delay-tolerant transmission is greater than a predefined threshold, and, if so, to cancel the delay-tolerant transmission.

According to another aspect of the subject matter described herein, a radio node for a cellular communications network is provided. In one embodiment, the radio node is adapted to schedule one or more delay-tolerant transmissions by one or more respective wireless devices in a subframe. The scheduling comprises, for each wireless device, identifying a plurality of available resources in the subframe, and, for each available resource of the identified plurality of available resources, determining one or more link adaptation parameters for the wireless device based on information representing a predicted puncturing of delay-tolerant transmissions using the available resource in order to enable transmission of delay-sensitive transmissions.

According to another aspect of the subject matter described herein, a radio node for a cellular communications network is provided. In one embodiment, the radio node comprises means for scheduling one or more delay-tolerant transmissions by one or more respective wireless devices in a subframe. In one embodiment, the means for scheduling comprises means for identifying a plurality of available resources in the subframe and means for determining, for each available resource of the identified plurality of available resources, one or more link adaptation parameters for the wireless device based on information representing a predicted puncturing of delay-tolerant transmissions using the available resource in order to enable transmission of delay-sensitive transmissions.

According to another aspect of the subject matter described herein, a radio node for a cellular communications network is provided. In one embodiment, the radio node comprises a first scheduling module operable to schedule one or more delay-tolerant transmissions by one or more respective wireless devices in a subframe. In one embodiment, the first scheduling module comprises a second identifying module operable to identify a plurality of available resources in the subframe and a third determining module operable to determine, for each available resource of the identified plurality of available resources, one or more link adaptation parameters for the wireless device based on information representing a predicted puncturing of delay-tolerant transmissions using the available resource in order to enable transmission of delay-sensitive transmissions.

According to another aspect of the subject matter described herein, a non-transitory computer readable medium is provided. The non-transitory computer readable medium stores software instructions that when executed by one or more processors of a radio node cause the radio node to schedule one or more delay-tolerant transmissions by one or more respective wireless devices in a subframe. In one embodiment, the scheduling comprises, for each wireless device, identifying a plurality of available resources in the subframe, and, for each available resource of the identified plurality of available resources, determining one or more link adaptation parameters for the wireless device based on information representing a predicted puncturing of delay-tolerant transmissions using the available resource in order to enable transmission of delay-sensitive transmissions.

According to another aspect of the subject matter described herein, a computer program comprising instructions is provided which, when executed by at least one processor, cause the at least one processor to carry out the method according to any one of claims 1 to 7. According to another embodiment of the subject matter described herein, the computer program comprises a carrier, wherein the carrier is an electronic signal, an optical signal, a radio signal, and/or a computer readable storage medium.

According to another aspect of the subject matter described herein, another method of operation of a scheduler implemented in a network node of a cellular communications system is provided. In one embodiment, the method comprises assigning, from a set of communication resources in a communications subframe, at least one subset of resources for use by respective delay-tolerant communications. The method comprises, for each of the at least one subset of resources, determining a respective probability of puncturing, wherein the probability of puncturing comprises a probability that the subset of resources may be punctured by a delay-sensitive communication, and modifying the link adaptation for the respective delay-tolerant communication based on the determined probability of puncturing.

In one embodiment, the method comprises triggering reuse of a subset of resources by the respective delay-tolerant communication to which it is assigned if the probability of puncturing is below a threshold level. In one embodiment, determining the probability that the subset of resources may be punctured comprises determining a predicted number of puncturing events for that subset of resources. In one embodiment, determining the probability comprises determining a probability based on historical data, predicted future data, identified short term or long term trends, and/or predicted short term or long term trends.

In one embodiment, the method comprises maintaining, for each subset of resources, information related to actual puncturing events. In one embodiment, the maintained information is used during selection of a subset of resources for puncturing. In one embodiment, the method comprises determining a ratio of the actual number of puncturing events to the predicted number of puncturing events. In one embodiment, using the determined ratios to select a subset of resources for puncturing comprises selecting for puncturing a subset of resources having the lowest ratio.

In one embodiment, the method comprises determining whether a ratio for a subset of resources exceeds a threshold value, and, in response to such determination, cancelling the respective delay-tolerant communication associated with that subset of resources, and identifying that subset of resources as available for puncturing.

In one embodiment, modifying the link adaptation comprises selecting a time and/or frequency, selecting precoder resources, setting a spreading code, setting a repetition level, setting a power level, setting an aggregation level, setting a modulation level, and/or setting an encoding level.

According to another aspect of the subject matter described herein, a radio node for a cellular communications network is provided. In one embodiment, the radio node comprises one or more transmitters, one or more receivers, one or more processors, and memory storing instructions executable by the one or more processors. The radio node is operable to assign, from a set of communication resources in a communications subframe, at least one subset of resources for use by respective delay-tolerant communications. For each of the at least one subset of resources, the radio node is operable to determine a respective probability of puncturing, wherein the probability of puncturing comprises a probability that the subset of resources may be punctured by a delay-sensitive communication, and modify the link adaptation for the respective delay-tolerant communication based on the determined probability of puncturing.

In one embodiment, the radio node is, via execution of instructions by the one or more processors, further operable to trigger reuse of a subset of resources by the respective delay-tolerant communication to which it is assigned if the probability of puncturing is below a threshold level. In one embodiment, determining the respective probability that the subset of resources may be punctured comprises determining a predicted number of puncturing events for that subset of resources. In one embodiment, determining the probability comprises determining a probability based on at least one of historical data, predicted future data, identified short term or long term trends, and/or predicted short term or long term trends.

In one embodiment, the radio node is, via execution of instructions by the one or more processors, further operable to maintain, for each subset of resources, information related to actual puncturing events. In one embodiment, the maintained information is used during selection of a subset of resources for puncturing.

In one embodiment, the radio node is, via execution of instructions by the one or more processors, further operable to determine a ratio of the actual number of puncturing events to the predicted number of puncturing events. In one embodiment, using the determined ratios to select a subset of resources for puncturing comprises selecting for puncturing a subset of resources having the lowest ratio.

In one embodiment, the radio node is, via execution of instructions by the one or more processors, further operable to determine whether a ratio for a subset of resources exceeds a threshold value, and, in response to such a determination, cancel the respective delay-tolerant communication associated with that subset of resources, and identify that subset of resources as available for puncturing. In one embodiment, modifying the link adaptation comprises selecting a time and/or frequency, selecting precoder resources, setting a spreading code, setting a repetition level, setting a power level, setting an aggregation level, setting a modulation level, and/or setting an encoding level.

According to another aspect of the subject matter described herein, a radio node for a cellular communications network is provided. In one embodiment, the radio node is adapted to assign, from a set of communication resources in a communications subframe, at least one subset of resources for use by respective delay-tolerant communications. For each of the at least one subset of resources, the radio node is adapted to determine a respective probability of puncturing, wherein the probability of puncturing comprises a probability that the subset of resources may be punctured by a delay-sensitive communication, and modify the link adaptation for the respective delay-tolerant communication based on the determined probability of puncturing.

According to another aspect of the subject matter described herein, a radio node for a cellular communications network is provided. In one embodiment, the radio node comprises means for assigning, from a set of communication resources in a communications subframe, at least one subset of resources for use by respective delay-tolerant communications. The radio node further comprises means for, for each of the at least one subset of resources, determining a respective probability of puncturing, wherein the probability of puncturing comprises a probability that the subset of resources may be punctured by a delay-sensitive communication, and modifying the link adaptation for the respective delay-tolerant communication based on the determined probability of puncturing.

According to another aspect of the subject matter described herein, a radio node for a cellular communications network is provided. In one embodiment, the radio node comprises a first assigning module operable to assign, from a set of communication resources in a communications subframe, at least one subset of resources for use by respective delay-tolerant communications. The radio node further comprises a second determining module operable to determine, for each of the at least one subset of resources, a respective probability of puncturing, wherein the probability of puncturing comprises a probability that the subset of resources may be punctured by a delay-sensitive communication. The radio node further comprises a third modifying module operable to modify the link adaptation for the respective delay-tolerant communication based on the determined probability of puncturing.

According to another aspect of the subject matter described herein, a non-transitory computer readable medium is provided. The non-transitory computer readable medium stores software instructions that when executed by one or more processors of a radio node cause the radio node to assign, from a set of communication resources in a communications subframe, at least one subset of resources for use by respective delay-tolerant communications. For each of the at least one subset of resources, the radio node determines a respective probability of puncturing, wherein the probability of puncturing comprises a probability that the subset of resources may be punctured by a delay-sensitive communication, and modifies the link adaptation for the respective delay-tolerant communication based on the determined probability of puncturing.

According to another aspect of the subject matter described herein, a computer program comprising instructions is provided which, when executed by at least one processor, cause the at least one processor to carry out the method according to any one of claims 21 to 30.

According to another aspect of the subject matter described herein, the computer program comprises a carrier, wherein the carrier is an electronic signal, an optical signal, a radio signal, and/or a computer readable storage medium.

Solutions according to some embodiments of the present disclosure may allow for enhanced capacity of virtual networks sharing the same physical resources to support delay-critical sessions and delay-tolerant sessions with coverage enhancement through repetition or higher aggregation levels.

The Internet of Things (IoT) market is predicted to grow exponentially in the near future and mobile operators are aiming at supporting those mixed traffic types with multiple virtual networks sharing a given set of physical resources. Solutions according to some embodiments of the present disclosure may facilitate this growth.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
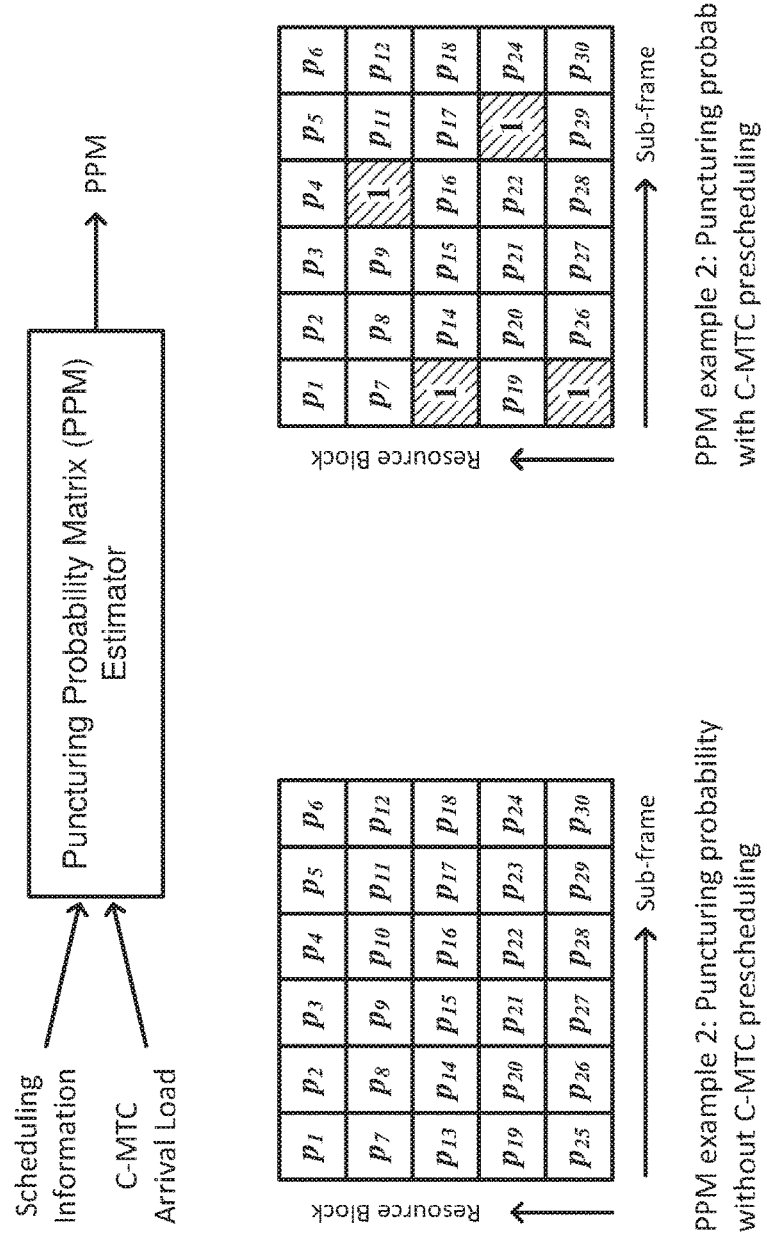
FIG. 1 illustrates the concept of a Puncturing Probability Matrix (PPM)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

This disclosure relates to Machine-Type Communication (MTC) and particularly to enabling the coexistence of delay-tolerant and delay-sensitive sessions over MTC, referred to herein, respectively, as Massive Machine-Type Communication (M-MTC) and Critical Machine-Type Communication (C-MTC). More particularly, this disclosure relates to Coverage Enhancement (CE) through link adaptation, where link adaptation may include, without limitation, any one or a combination of actions such as setting or modifying power controls, modulation and encoding, and repetition etc. Repetition of the information is a main technique to achieve coverage enhancements. It can be used for all physical channels available for coverage enhanced User Equipment devices (UEs), such as MTC-capable Physical Downlink Control Channel (M-PDCCH), Physical Broadcast Channel (PBCH), Physical Downlink Shared Channel (PDSCH), Physical Uplink Control Channel (PUCCH), Physical Uplink Shared Channel (PUSCH), and Physical Random Access Channel (PRACH) and any other channels that may operate in a similar manner. In some aspects of such a repetition technique, information is repeated over multiple transmission resources such as Transmit Time Intervals (TTIs), for each transmission. To select the appropriate link adaptation, several factors may be considered, including statistical traffic activity prediction, especially for the purpose of predicting the likelihood of puncturing/overwriting of a few resources assigned to latency tolerant traffic, with coverage enhancement through repetition, to reassign them to more delay-critical traffic. The concepts described herein may be applied to both Frequency Division Duplex (FDD) and dynamic flexible Time Division Duplex (TDD) systems.

As used herein, a "radio node" is either a radio access node or a wireless device. A radio node may be centralized at a single physical location or distributed across multiple physical locations.

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), a relay node, an access point.

As used herein, a "wireless device" is any type of device that has access to (i.e., is served by) a cellular communications network by wirelessly transmitting and/or receiving signals to one or more radio access nodes. Some examples of a wireless device include, but are not limited to, a UE in a 3GPP LTE network and a MTC device.

As used herein, a "network node" is any node that is either part of the radio access network or the core network of a cellular communications network/system. A network node may be centralized at a single physical location or distributed across multiple physical locations.

Note that the description given herein focuses on a 3GPP LTE cellular communications system (or future generation of a 3GPP LTE cellular communications system) and, as such, 3GPP LTE terminology or terminology similar to 3GPP LTE terminology is oftentimes used. However, the concepts disclosed herein are not limited to a 3GPP LTE system.

Note that, in the description herein, reference may be made to the term "cell". However, particularly with respect to Fifth Generation (5G), concepts, beams may be used instead of cells and, as such, it is important to note that the concepts described herein are equally applicable to both cells and beams.

It has been noted above that doing hard-slicing has disadvantages and doing soft-slicing is not straightforward. Typically, some service-level guarantees would need to be enforced for the C-MTC and M-MTC services operating under a soft-slicing approach. For C-MTC, as long as the traffic profile meets certain criteria (in relation to the number of sessions, session payloads, and session distributions in time/frequency/space, etc.), low latency access is guaranteed. This could translate into "instantaneous" access to all radio resources of the cell managed with soft-slicing, for a given small time interval, but would always ensure that M-MTC is provided, on average, with an agreed long-term averaged fraction of the radio resources. With high M-MTC load and substantial but unpredictable bursty C-MTC traffic, the benefit of being able to puncture M-MTC traffic to squeeze-in C-MTC traffic becomes obvious to maximize system capacity.

Sharing physical resources for multiple service types with different levels of latency tolerance and repetitions is even more difficult in a dynamic TDD single band system. For such a system, in order to schedule an uplink or downlink C-MTC transmission, it will be necessary to puncture an M-MTC transmission.

If a downlink M-MTC transmission is punctured, this could impair the downlink transmission, which could result in a failed downlink transmission. For example, for a low-power M-MTC device, it may be necessary to send the same downlink transmission to the M-MTC device several times in order to ensure that the transmission is correctly received by that M-MTC device. Puncturing such a repetitive transmission to the M-MTC device reduces the number of copies of the transmission received by that M-MTC device, which could lead to the downlink transmission being ultimately unsuccessful because the M-MTC device did not have enough data with which to determine or reconstruct the intended downlink transmission.

If an uplink M-MTC transmission is punctured, this raises new difficulties. For example, for a low-power M-MTC device, that M-MTC device may be granted permission to send an uplink transmission multiple times without having to receive an explicit uplink grant every time. Such a device may repeatedly send an uplink transmission without waiting for—or even listening for—an uplink grant, and so there may be no way to notify such a device that it should pause its uplink transmission so that a C-MTC transmission may occupy those resources. In this scenario, the C-MTC may send a downlink transmission while the M-MTC continues to blindly send its uplink transmission using the same resources. The resulting interference could result in unsuccessful M-MTC transmission and perhaps even an unsuccessful C-MTC transmission as well.

In anticipation of this scenario, the heavily interfered uplink M-MTC transmission can be set up so that its link adaptation/power control is adapted to the predicted probabilistic level of effective puncturing, e.g., in anticipation that a subset of the resource will be dominated by noise (i.e., the interfering C-MTC transmission) and will thus be effectively almost punctured out of the set of resources which can be used to properly detect the message. As will be described in more detail below, this adaptation can include, without limitation, any one or a combination of any one of actions such as increasing the number of repetitions, changing to a more robust encoding/modulation, making adjustments to transmission power etc.

In order to adapt the link adaptation/power level, to a predicted level of effective (i.e., real; actually occurring versus being predicted) puncturing level, one must first be able to predict that level. If one knew in advance the pattern of C-MTC transmissions, and the TDD pattern associated with the transmissions, one would know with 100% probability, the level of puncturing which would be applied to the M-MTC transmissions as it is being assigned resources. Sadly, C-MTC transmissions are not always "pre-scheduled" and the TDD pattern can sometimes be fully flexible and adapt to the transmission requirements which are unknown in advance. Accordingly, there is a need to predict the statistical characteristics associated with the effective puncturing pattern. To do so, one can directly try to obtain a statistical model for the puncturing pattern based on historical records. One can also try to dig into modeling the transmission pattern of the different services and the associated duplexing transmission pattern, or any other factor which could impact the puncturing pattern, and try to come up with a statistical model for those patterns, which can then be mapped to a statistical model for the puncturing levels.

As described above, coexistence of different types of traffic with different delay sensitivity and different resource assignment duration is difficult with soft-slicing, because it can prevent delay-critical sessions from having immediate access to resources, and hard-slicing can lead to trunking inefficiencies.

In dynamic TDD systems, one also has issues associated with the fact that downlink M-MTC transmissions might need to be interrupted or cancelled by an uplink C-MTC transmission, and a scheduled uplink M-MTC reception might fail because of an urgent subsequently scheduled downlink C-MTC transmission (not to mention that the reception of this same downlink C-MTC transmission might also be interfered by the uplink M-MTC transmission).

"Puncturing" is attractive, but simply doing puncturing can lead to a reception which is no longer possible to successfully detect.

Based on the above, systems and methods according to embodiments disclosed herein relate to allowing delay-critical sessions to have immediate access to part of the resources already assigned to a delay-tolerant session. In some embodiments, the assumption is that some of those delay-tolerant sessions will be assigned a relatively large resource set, because of coverage (e.g., to improve the likelihood of successful communication despite a weak signal due to noise and/or distance.). This larger resource set would take the form of repetition or aggregation of the data over a larger set than would have been required for effective communication over a shorter range. This increased aggregation or repetition level may be configured as part of the link adaptation. Other parts of the link adaptation include the choice of an appropriate modulation order, coding rate, and power level. According to some embodiments of the present disclosure, adapting the link adaptation in response to (e.g., to compensate for) a predicted level of puncturing of the resources assigned to the delay-tolerant transmission is proposed. This puncturing may be done for the sake of squeezing in transmission(s) associated with delay-critical sessions. Such punctured resources may be associated with a noise only contribution in the receiver repetition combining method, which could use, for example, an incremental redundancy soft-combining method similar to what is used in Hybrid Automatic Repeat Request (HARQ). In this way, a conservative higher repetition level and/or power level and/or conservative Modulation and Coding Scheme (MCS) level, and/or any other more conservative (i.e., more robust) link adaptation attributes may be selected based on the predicted probability of resource "puncturing."

In some embodiments, a goal is to be able to accommodate the delay-critical traffic with minimal disruption to the delay-tolerant traffic, to minimize the impact to, for example, the battery lifetime of the devices involved in the transmissions/receptions associated with delay-insensitive sessions.

In some embodiments, an assumption is that the system can predict the probability for individual resource elements (smallest scheduling resource entity) to be reassigned to delay-critical sessions, or to be unusable because of delay-critical sessions (e.g., guard time for duplexing change triggered for delay-critical sessions). Note that joint probabilities among resource elements are often of interest and should be predicted. As an example, if delay-critical sessions are often assigned more than one resource element, the probability that an element will be used given that an element in the adjacent frequency bin will also be used might be different than the probability that this same element will be used given that the same element in the adjacent frequency bin will not be used. The prediction may require the use of multidimensional arrays which would characterize the estimated joint probability that a resource element needs to be punctured in the future. The array may cover all scheduling dimensions (time, frequency, spreading codes, spatial pre-coders, etc.). The probability of puncturing of elements may need to be considered jointly if the probability that a resource element is reassigned to a more urgent/important transmission depends on the probability that another element has already been reassigned to this same or a different, more urgent/important transmission.

Embodiments of the present disclosure also cover provisions for interrupting transmissions associated with delay-tolerant sessions in the event that the actual puncturing level goes beyond what was predicted and was used in the link adaptation. If the puncturing brings the predicted Signal to Interference plus Noise Ratio (SINR) after aggregation at the receiver to a level which is deemed to be insufficient, one may cancel whatever remaining part of the transmission it is possible to cancel. So, the scheduler may constantly assess the actual puncturing level associated with the delay-tolerant session, and may try to make sure that it remains below or equal to what is acceptable based on the link adaptation setting that was used in setting up the transmission, and may, as a last resort, cancel what can still be cancelled, if it sees that the actual puncturing level goes beyond what could lead to a successful detection with an acceptable level on confidence.

Embodiments of the present disclosure also cover an associated aspect: the scheduling of the delay-critical sessions may need to be controlled by the scheduler to minimize the impact to the delay-tolerant sessions, given the link adaptation setting that was used, given the predicted worst-case puncturing level that was expected. The scheduler may try to spread around the puncturing to different delay-tolerant sessions in an attempt to maintain equally high probabilities of proper detection for all of them but, if the load of delay-critical sessions is too high, so that the probability of error in detection may become too high globally for all punctured delay-tolerant sessions, it may switch to a mode of operation for which as few delay-tolerant sessions are disrupted. If the puncturing prediction was adequate, the puncturing should be "absorbed" by the link adaptation but, if the puncturing was underestimated, the puncturing may be focused on as few sessions as possible, which may then be cancelled. And if the puncturing was overestimated, the scheme may result in slightly under-aggressive link adaptation, which may translate in a slight degradation in the spectral efficiency of the resources used for the delay-tolerant sessions.

According to some embodiments, the present disclosure proposes to allow resources assigned to delay-tolerant sessions to be re-assigned (punctured) for delay-critical sessions, but adapts the link adaptation of the punctured delay-tolerant session based on a predicted level of puncturing, which is associated with the estimated delay-critical traffic profile. Some embodiments of the present disclosure therefore pertain to one or more of:

Puncturing estimation: estimating the probability of resources being reassigned (punctured) from delay-tolerant sessions to delay-critical sessions;

Adapted link adaptation: applying a mechanism to modify the "normal" link adaptation mechanism of the delay-tolerant sessions to compensate for a predicted level of puncturing;

Distributed puncturing: spreading the puncturing across more delay-tolerant sessions (one criterion for the scheduling of the delay-critical sessions might be to try to puncture the delay-tolerant sessions so as to maintain the puncturing level of the delay-tolerant sessions at a level below what is acceptable given the modified link adaptation); and Focused puncturing: if distributed puncturing impairs too many delay-tolerant sessions, puncture as few delay-tolerant sessions as possible. Such delay-tolerant sessions may be cancelled and all of their resources used for puncturing. One criterion for a network entity such as a scheduler to focus any additional puncturing might be whether the level of puncturing is already maximal compared to what was provisioned in the link adaptation of the delay-tolerant sessions. In such a case, the decision may be to puncture as few delay-tolerant sessions as possible. According to further embodiments, the data still to be transmitted to those few sacrificed sessions is also be cancelled, if the probability of proper detection is too low.

Next, an illustrative embodiment for the present disclosure is provided.

ILLUSTRATIVE EMBODIMENT

For the purpose of illustration, it is assumed that the schedulable radio resources in a system form a time-frequency grid where the unit of scheduling in time is called a subframe and the unit of scheduling in frequency is called a Resource Block (RB). The system under consideration is FDD. This embodiment focuses on the downlink transmissions.

Puncturing Probability Matrix (PPM)

FIG. 1 illustrates an exemplary Puncturing Probability Matrix (PPM) and PPM estimator according to an embodiment of the subject matter described herein. For simplicity of presentation, it is assumed that each resource unit will be associated with a probability of puncturing independent of other resource units. Such an assumption may be reasonable under scenarios where a C-MTC burst uses a single unit of resource. The probability of puncturing, in that case, can be represented by the PPM as shown in FIG. 1. An element of PPM corresponds to the probability that a particular unit of resource will be punctured by C-MTC traffic.

In some embodiments, the PPM estimator may get, as input, the following information: scheduling information for C-MTC traffic, and C-MTC traffic statistics. As output, it computes the PPM, which provides the probability that a particular resource unit in the resource grid of the upcoming subframes will be punctured. FIG. 1 shows two examples, with and without C-MTC pre-scheduling. In example 1, pre-scheduling of C-MTC traffic is not supported. In that case, the puncturing probabilities $\{p_i\}$ can be calculated based on the arrival rate of C-MTC traffic bursts. For example, if resource allocation of C-MTC traffic bursts does not follow any preference (one example of such preference can be allocating C-MTC traffic from RBs in a particular order), the probabilities can be approximated as $p_i = p$ where p is the average resource utilization due to C-MTC traffic. If resource allocation for C-MTC traffic follows a preference order, these probabilities can be different. In example 2, C-MTC transmissions are pre-scheduled in later subframes on certain RBs which correspond to a puncturing probability of 1. The puncturing probabilities $\{p_i\}$ in this case are calculated based on the arrival rate of C-MTC traffic bursts, the scheduling information, and the resource allocation preference, if any. Using the extra information of pre-scheduled resources improves the PPM estimation and hence leads to a better link adaptation. While presenting the scheduling loop below, it will be illustrated how PPM can be used to improve C-MTC/M-MTC co-existence.

Scheduling Loop as an Enabler of C-MTC/M-MTC Enhanced Co-Existence

The following assumptions are made about the system under consideration and an embodiment of the present disclosure for this system is presented. These assumptions are made for simplifying the presentation, but the subject matter described herein is not limited thereto.

M-MTC transmission can be scheduled with repetition in time for coverage enhancement. C-MTC transmissions, on the other hand, are scheduled for one subframe at a time. Without loss of generality, it is also assumed that a C-MTC or an M-MTC transmission occupies exactly one RB (i.e., one unit in terms of frequency resource).

Resource allocation policy does not have a preference order in terms of allocation of RBs for a particular traffic type.

To further simplify the presentation, it is assumed that the forward scheduling, whereby a burst is scheduled in a RB in a future subframe, is not used and thus any burst, if scheduled, is scheduled in a resource of the current subframe. The presented embodiment can be easily extended when forward scheduling is enabled.

The scheduler internally maintains the following data:

List of ongoing M-MTC transmissions along with the following information for each of them: the scheduling and link adaptation decision variables (modulation and coding scheme, transmit power, repetition level), the estimated number of puncturing calculated during link adaptation, and the accumulated number of puncturing that has already occurred; and The puncturing probability matrix.

The scheduler receives, as input, the following in the beginning of each scheduling loop (which occurs just before the start of a new subframe): a) a list of new M-MTC transmissions required to be scheduled ($\Omega\_M$), b) a list of new C-MTC transmissions required to be scheduled ($\Omega\_C$), c) SINR per UE from Channel Feedback Processor (SINR [UE1], SINR[UE2], etc.), and d) SINR adjustments from HARQ Feedback Processor: (adjustment[UE1], adjustment [UE2], etc.).

The scheduling loop can be described with the following pseudo-code. Note that the pseudo-code comprises three sub-loops executed in the specified order.

```
    1)    Sub-loop for new C-MTC transmissions
For each (C-MTC) UE in Ω_c:
    // Link adaptation
    Determine MCS, and transmit power p;
    MCS[UE], p[UE] = f(SINR[UE] + adjustment[UE]) where f(.) is
    a configured mapping from SINR to MCS and transmit power;
    // Resource allocation
    Select a resource block in the current sub-Frame based on
    some selection criteria;    // An example is provided later
    If resource allocation is successful:
        Transmit the C-MTC in the chosen resource block;
    End If
    If the resource allocation punctures an ongoing M-MTC:
        Update accumulated number of puncturing for the M-MTC;
        If the puncturing level for the M-MTC exceeds the
        estimated number of puncturing calculated during link
        adaptation plus a margin:
            Remove the M-MTC transmission from the list of
            ongoing M-MTC transmissions;
        End If
    End If
    Update PPM
End For
    2)    Sub-loop for ongoing M-MTC transmissions
For each ongoing M-MTC transmission:
    If the resource block allocated to this M-MTC is not
    punctured in the current sub-frame:
        Transmit in the allocated resource block;
    End If
End For
    3)    Sub-loop for new M-MTC transmissions
For each (M-MTC) UE in Ω_M:
    Find the list of available resource blocks (i.e., not used
    by any previous transmissions in the current sub-frame);
    For each available resource block RB:
        //Link adaptation
        Determine MCS, transmit power and repetition level, as
        well as the estimated number of puncturing;
        nominalRepetitionLevel[UE,RB], MCS[UE,RB],
        power[UE,RB] = f1(SINR[UE,RB] + adjustment[UE, RB])
        actualRepetitionLevel[UE, RB],
        estimatedNrofPuncturing[UE,RB] =
        g(nominalRepetitionLevel[UE, RB], PPM);
        // f1(.) and g(.) are pre-configured mappings.
    End For
    // Resource allocation
    Select an available resource block that requires the
    smallest number of repetitions;
    If resource allocation is successful:
        Transmit on the selected resource block;
        Add this transmission to the scheduler-internal list
        of ongoing M-MTC transmissions along with the
        associated information;
    End If
End For
```

The following is an example of a RB selection criteria for C-MTC transmission:

Do not choose an RB already chosen for another C-MTC.
Prefer an empty RB over an RB allocated to an ongoing M-MTC transmission.

If no empty RB is available, puncture an RB of an ongoing M-MTC transmission that has the smallest value of the ratio of the accumulated number of puncturing that has already occurred to the estimated number of puncturing calculated during link adaptation.

Example System Architecture and Operation

Embodiments of the present disclosure are implemented in a cellular communications system, or network. One non-limiting example of a cellular communications system 10 is illustrated in FIG. 2.

Figure 2:
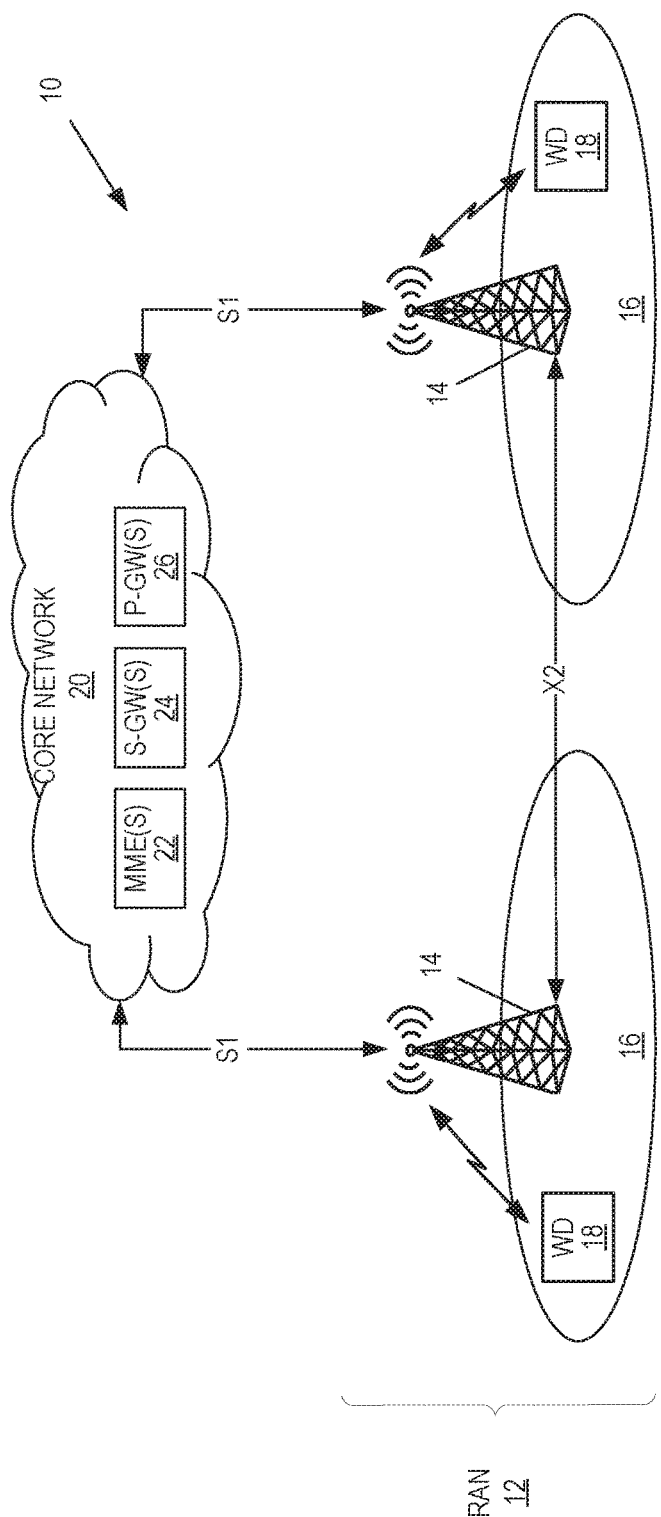
FIG. 2 illustrates one non-limiting example of a cellular communications system according to one embodiment of the present disclosure.

FIG. 2 illustrates an exemplary cellular communications system 10 having a scheduler implemented in a network node according to an embodiment of the subject matter described herein. In the embodiment illustrated in FIG. 2, the cellular communications system 10 includes a Radio Access Network (RAN) 12 including a number of radio access nodes, which in this illustrated example are base stations 14. In 3GPP LTE, the base stations 14 may be, for example, eNBs or low-power base stations (e.g., pico, micro, femto, or home base stations). The base stations 14 have cells 16 that provide radio access to wireless devices 18 (e.g., UEs) in corresponding cells 16 of the base stations 14. Note that while cells 16 are shown in the example of FIG. 2, in other embodiments, the base stations 14 may transmit on multiple beams. In this example, the base stations 14 communicate via an X2 connection (or more generally a base-station-to-base-station connection). In addition, the base stations 14 are connected to a core network 20, which includes various core network nodes such as, e.g., one or more Mobility Management Entities (MMEs) 22, one or more Serving Gateways (S-GWs) 24, and one or more Packet Data Network Gateways (P-GWs) 26.

The wireless devices 18 include delay-sensitive wireless devices 18 (e.g., C-MTC devices) and delay-tolerant wireless devices 18 (e.g., M-MTC devices).

Figure 3:
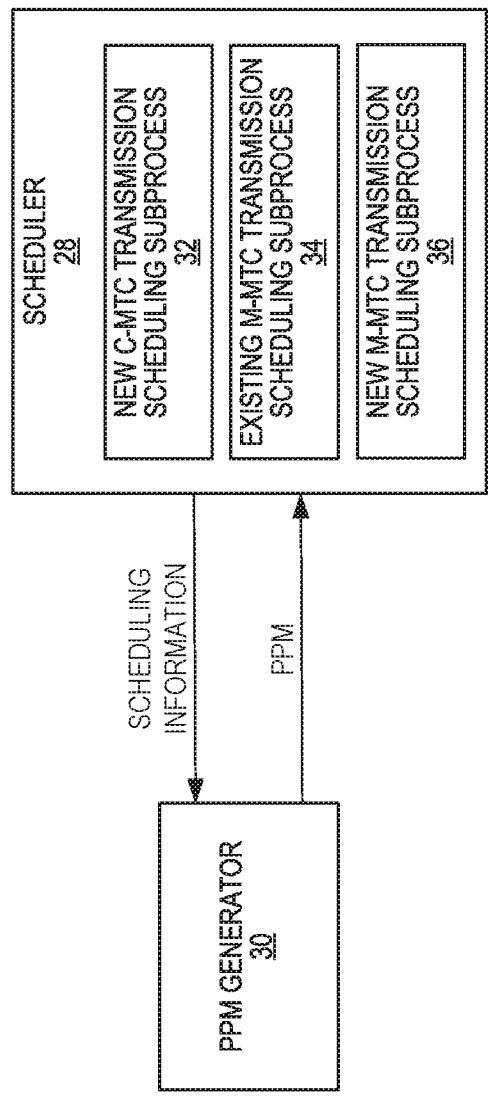
FIG. 3 illustrates a block diagram illustrating a scheduler and a PPM generator that operate to provide functionality according to embodiments of the present disclosure.

FIG. 3 is a block diagram illustrating a scheduler 28 and a PPM generator 30 that operate to provide functionality according to embodiments of the present disclosure. In some embodiments, the scheduler 28 is implemented within the base station 14 (or more generally within a radio access node). The scheduler 28 may be implemented in software that is stored in, e.g., memory and executed by one or more processors (e.g., one or more Central Processing Units (CPUs), one or more Application Specific Integrated Circuits (ASICs), one or more Field Programmable Gate Arrays (FPGAs), and/or the like) of the base station 14 (or more generally a radio access node). The PPM generator 30 may be implemented in the base station 14 or some other network node. In some embodiments, the PPM generator 30 is implemented in software that is stored, e.g., in memory and executed by one or more processors of a network node.

The PPM generator 30 operates to generate a PPM representing a statistical model of the probability of individual resources being punctured (i.e., re-assigned to delay-critical sessions, e.g., C-MTC sessions), as described above. Note that a PPM is only one example representation of the statistical model. The statistical model may vary depending on the particular implementation.

The scheduler 28 includes a new C-MTC transmission scheduling sub-process 32, an existing M-MTC transmission scheduling sub-process 34, and a new M-MTC transmission scheduling sub-process 36. A new transmission is a transmission that arrives in the current subframe. This term applies to both C-MTC and M-MTC transmissions. An existing transmission is a transmission that arrives at an earlier subframe but is still being transmitted due to repetition. Where C-MTC transmissions do not repeat, this term would apply only to M-MTC transmissions. (A new C-MTC transmission at a given subframe is transmitted in that subframe without repetition.)

Figure 4:
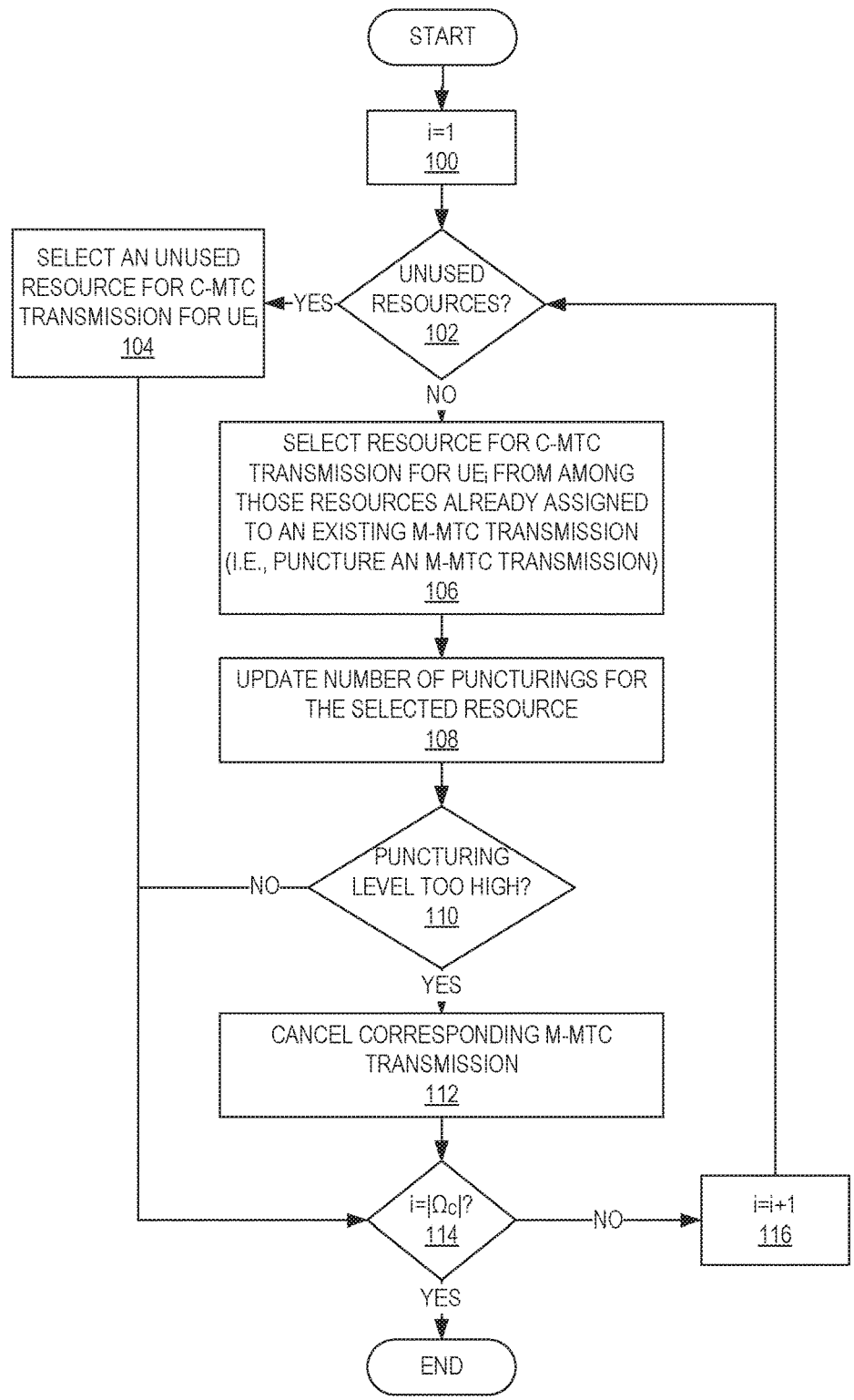
FIG. 4 is a flow chart that illustrates the operation of the Critical Machine-Type Communication (C-MTC) transmission scheduling sub-process of the scheduler of FIG. 3 according to some embodiments of the present disclosure.

FIG. 4 is a flow chart that illustrates the operation of the new C-MTC transmission scheduling sub-process 32 of the scheduler 28 of FIG. 3 according to some embodiments of the present disclosure. As illustrated, when scheduling for the current subframe, the new C-MTC transmission scheduling sub-process 32 sets an index i to an initial value, which in this example is 1 (step 100). The index i is an index to a list of wireless devices 18 for which C-MTC transmissions are to be scheduled in the current subframe. This set of wireless devices 18 is referred to in the pseudocode for the illustrative embodiment above as $\Omega_C$ and, as such, the same is used here.

The new C-MTC transmission scheduling sub-process 32 determines whether there are any unused resources in the current subframe (step 102). If so, the new C-MTC transmission scheduling sub-process 32 selects an unused resource in the current subframe to the C-MTC transmission for $UE_i$ (step 104), and the process then proceeds to step 114. However, if there are no unused resources in the current subframe, the new C-MTC transmission scheduling sub-process 32 selects a resource for the C-MTC transmission for $UE_i$ from among those resources in the current subframe that are already assigned to an existing M-MTC transmission/session (step 106). In other words, the new C-MTC transmission scheduling sub-process 32 selects a resource that will puncture an existing M-MTC transmission/session. The C-MTC transmission scheduling sub-process 32 may use any suitable criteria for making the selection in step 106. One example set of criteria is as follows:

Do not choose a resource already chosen for another C-MTC. Prefer an empty resource over a resource allocated to an ongoing M-MTC transmission. If no empty resource is available, puncture a resource of an ongoing M-MTC transmission that has the smallest value of the ratio of the accumulated number of puncturing that has already occurred to the estimated number of puncturing calculated during link adaptation.

Note, however, that the set of criteria given above is only an example. The new C-MTC transmission scheduling sub-process 32 updates an accumulated number of puncturings for the selected resource (step 108).

In some embodiments, the new C-MTC transmission scheduling sub-process 32 determines whether the level of puncturing for the selected resource is too high (e.g., above some predefined threshold such as, for example, the predicted level of puncturing plus a predefined margin) (step 110). If not, the process proceeds to step 114. However, if the level of puncturing for the selected resource is too high, the C-MTC transmission scheduling sub-process 32 cancels the corresponding existing M-MTC transmission (step 112). In other words, the existing M-MTC transmission is removed from the list of ongoing, or existing, M-MTC transmissions/sessions.

At this point, whether proceeding from step 104, step 110, or step 112, the new C-MTC transmission scheduling sub-process 32 determines whether the last UE in the set of UEs for which C-MTC transmissions are to be scheduled for the current subframe has been processed (step 114). If not, the index i is incremented (step 116), and the process returns to step 102. Once the last UE in the set of UEs for which C-MTC transmissions are to be scheduled for the current subframe has been processed, the process ends.

Figure 5:
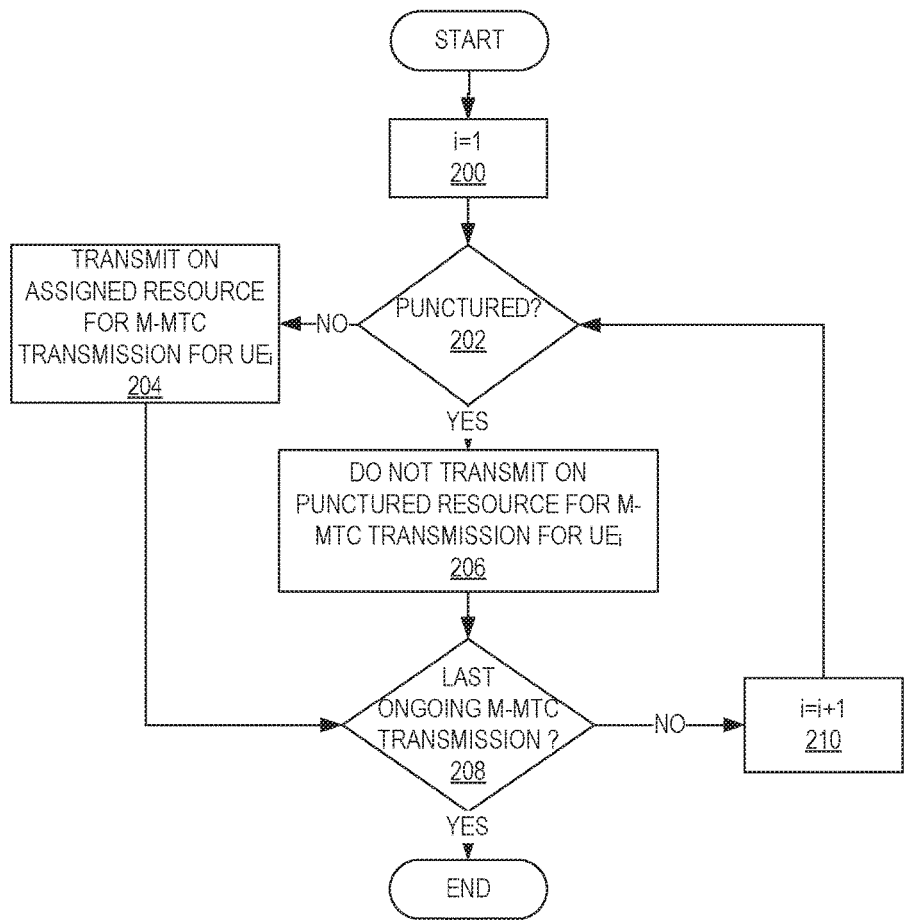
FIG. 5 is a flow chart that illustrates the operation of the existing Massive Machine-Type Communication (M-MTC) transmission scheduling sub-process of the scheduler of FIG. 3 according to some embodiments of the present disclosure.

FIG. 5 is a flow chart that illustrates the operation of the existing M-MTC transmission scheduling sub-process 34 of the scheduler 28 of FIG. 3 according to some embodiments of the present disclosure. As illustrated, when scheduling for the current subframe, the existing M-MTC transmission scheduling sub-process 34 sets an index i to an initial value, which in this example is 1 (step 200). The index i is an index to a list of wireless devices 18 for which there are ongoing, or existing, M-MTC transmissions/sessions.

The existing M-MTC transmission scheduling sub-process 34 determines whether the existing M-MTC transmission for $UE_i$ in the current subframe is punctured (i.e., whether the resource in the current subframe assigned to the existing M-MTC transmission for $UE_i$ has been re-assigned for a C-MTC transmission) (step 202). If not, the existing M-MTC transmission scheduling sub-process 34 transmits, or controls the respective radio access node to transmit the existing M-MTC transmission for $UE_i$ on the assigned resource in the current subframe (step 204), and the process then proceeds to step 208. However, if the existing M-MTC transmission for $UE_i$ in the current subframe has been punctured, the existing M-MTC transmission scheduling sub-process 34 does not transmit, or controls the respective radio access node to not transmit, the existing M-MTC transmission for $UE_i$ on the assigned resource in the current subframe (step 206).

At this point, whether proceeding from step 204 or 206, the existing M-MTC transmission scheduling sub-process 34 determines whether the last ongoing M-MTC transmission in the current subframe has been processed (step 208). If not, the index i is incremented (step 210), and the process returns to step 202. Once the last ongoing M-MTC transmission in the current subframe has been processed, the process ends.

Figure 6:
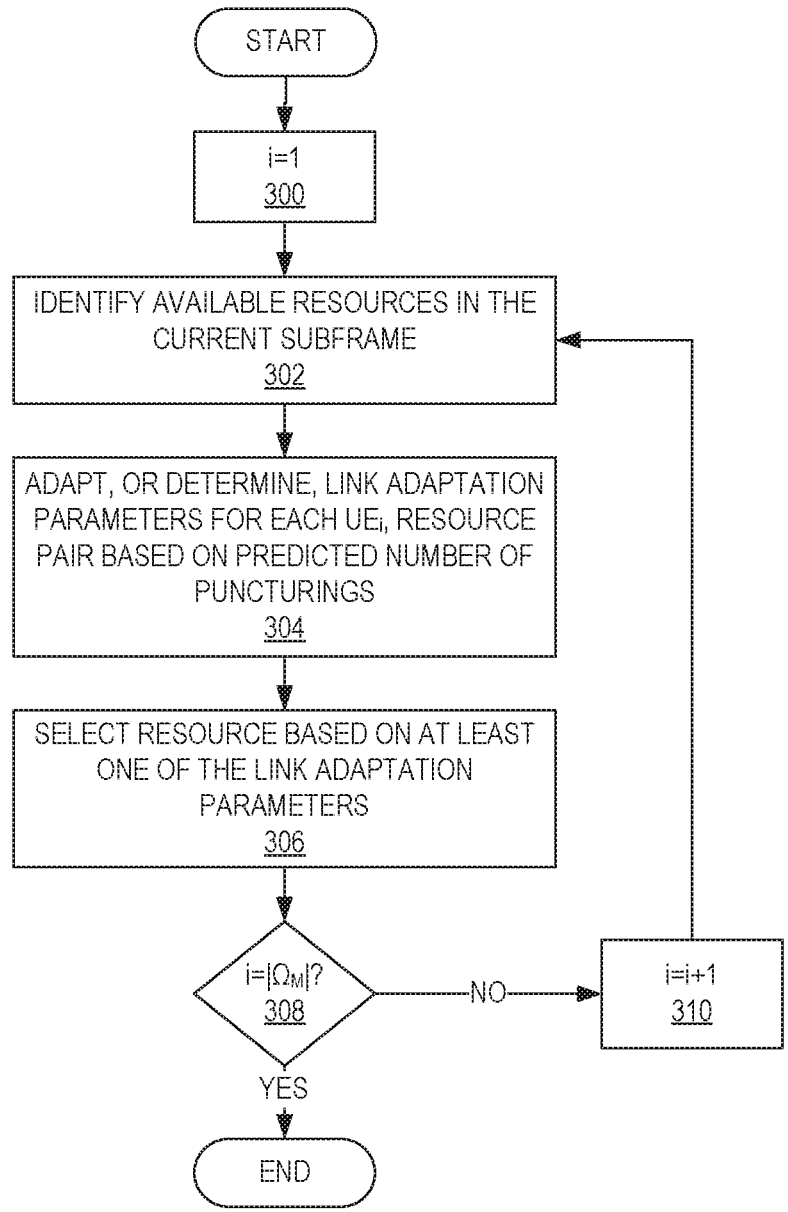
FIG. 6 is a flow chart that illustrates the operation of the new M-MTC transmission scheduling sub-process of the scheduler of FIG. 3 according to some embodiments of the present disclosure.

FIG. 6 is a flow chart that illustrates the operation of the new M-MTC transmission scheduling sub-process 36 of the scheduler 28 of FIG. 3 according to some embodiments of the present disclosure. As illustrated, when scheduling for the current subframe, the new M-MTC transmission scheduling sub-process 36 sets an index i to an initial value, which is this example is 1 (step 300). The index i is an index to a list of wireless devices 18 for which M-MTC transmissions are to be scheduled in the current subframe. This set of wireless devices 18 is referred to in the pseudocode for the illustrative embodiment above as $\Omega_M$ and, as such, the same is used here.

The new M-MTC transmission scheduling sub-process 36 identifies available resources in the current subframe (step 302). The available resources are those resources that are available for M-MTC transmissions that have not already been assigned to C-MTC transmissions or ongoing M-MTC transmissions. The new M-MTC transmission scheduling sub-process 36 adapts, or determines, link adaptation parameters for each $UE_i$, resource pair for the identified available resources based on the statistical information (e.g., the predicted number of puncturings in this example), as described above (step 304). The new M-MTC transmission scheduling sub-process 36 selects, from among the identified available resources, a resource for the new M-MTC transmission of $UE_i$ based on at least one of the adapted, or determined, link adaptation parameters for the available resources from step 304 (step 306). For example, as discussed above, in one illustrative embodiment, the new M-MTC transmission scheduling sub-process 36 selects the resource that requires the smallest number of estimated repetitions based on the statistical model.

The new M-MTC transmission scheduling a sub-process 36 determines whether the last UE in the set of UEs for which new M-MTC transmissions are to be scheduled for the current subframe has been processed (step 308). If not, the index i is incremented (step 310), and the process returns to step 302. Once the last UE in the set of UEs for which new M-MTC transmissions are to be scheduled for the current subframe has been processed, the process ends.

Figure 7:
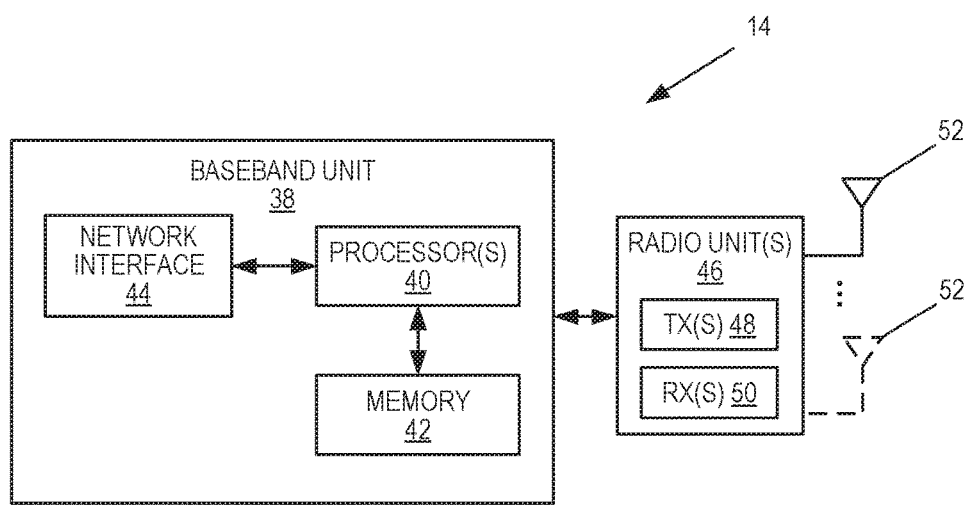
FIGS. 7 and 8 are block diagrams of a base station according to some embodiments of the present disclosure.

FIG. 7 is a schematic block diagram of the base station 14 according to some embodiments of the present disclosure. This discussion is equally applicable to other types of radio access nodes. Further, other types of network nodes may have similar architectures (particularly with respect to including processor(s), memory, and a network interface). As illustrated, the base station 14 includes a baseband unit 38 that includes one or more processors 40 (e.g., CPUs, ASICs, FPGAs, and/or the like), memory 42, and a network interface 44 as well as one or more radio units 46 that each includes one transmitters 48 and one or more receivers 50 coupled to one or more antennas 52. In some embodiments, the functionality of the base station 14 (or more generally the functionality of a radio access node or more generally the functionality of a network node) described above may be fully or partially implemented in software that is, e.g., stored in the memory 42 and executed by the processor(s) 40.

In some embodiments, a computer program including instructions which, when executed by at least one processor, causes the at least one processor to carry out the functionality of the scheduler 28 and/or the PPM generator 30 (e.g., implemented in a network node or a radio access node such as, e.g., the base station 14) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 8:
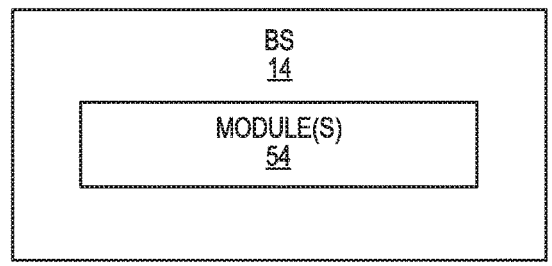

FIG. 8 is a schematic block diagram of the base station 14 according to some other embodiments of the present disclosure. The base station 14 includes one or more modules 54, each of which is implemented in software. The module(s) 54 provide the functionality of the base station 14 described herein. Note that other types of radio access nodes and network nodes may be similar architectures as shown in FIG. 8 for the base station 14.

Figure 9:
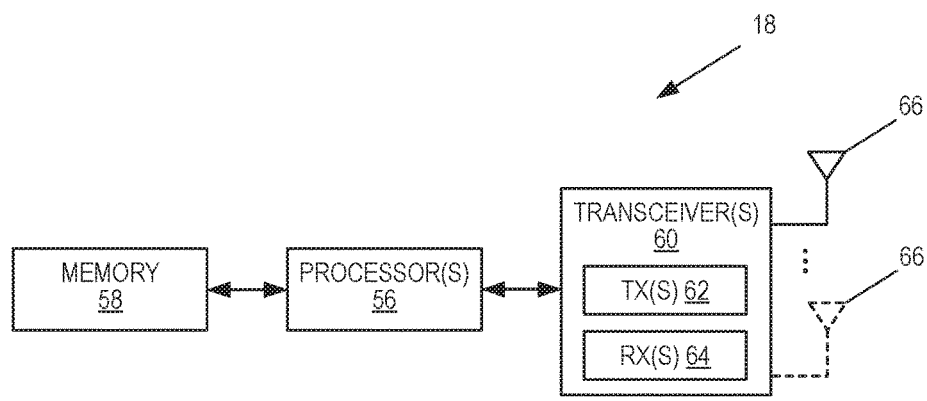
FIGS. 9 and 10 are block diagrams of a wireless device according to some embodiments of the present disclosure.

FIG. 9 is a schematic block diagram of the wireless device 18 (e.g., an M-MTC device or a C-MTC device) according to some embodiments of the present disclosure. As illustrated, the wireless device 18 includes one or more processors 56 (e.g., CPUs, ASICs, FPGAs, and/or the like), memory 58, and one or more transceivers 60 each including one or more transmitter 62 and one or more receivers 64 coupled to one or more antennas 66. In some embodiments, the functionality of the wireless device 18 described above may be fully or partially implemented in software that is, e.g., stored in the memory 58 and executed by the processor(s) 56.

In some embodiments, a computer program including instructions which, when executed by at least one processor, causes the at least one processor to carry out the functionality of the wireless device 18 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 10:
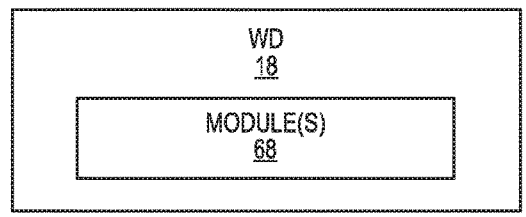

FIG. 10 is a schematic block diagram of the wireless device 18 according to some other embodiments of the present disclosure. The wireless device 18 includes one or more modules 68, each of which is implemented in software. The module(s) 68 provide the functionality of the wireless device 18 (e.g., UE) described herein.

Figure 11:
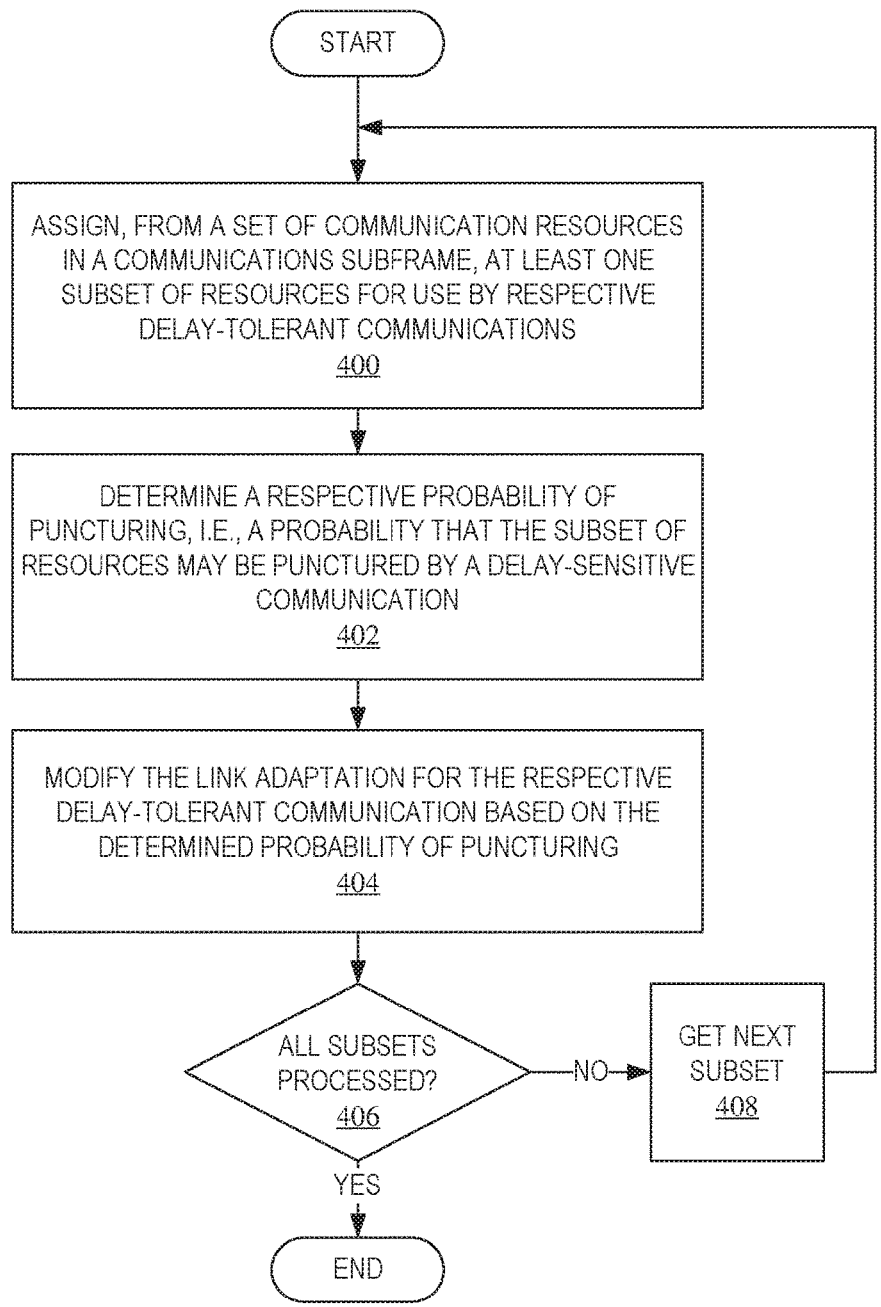
FIG. 11 is a flow chart that illustrates a method of scheduling and/or link adaptation at a transmitter according to some embodiments of the present disclosure.

FIG. 11 is a flow chart that illustrates a method of scheduling and/or link adaptation at a transmitter according to some embodiments of the present disclosure. In the embodiment illustrated in FIG. 11, at least one subset of resources from a set of communication resources in a communications subframe is assigned for use by a delay-tolerant communication (step 400). A respective probability of puncturing (i.e., a probability that the subset of resources may be punctured by a delay-sensitive communication) is determined (step 402). The link adaptation for the respective delay-tolerant communication is modified based on the determined probability of puncturing (step 404). The process loops until all subsets have been processed (steps 406 and 408).

Figure 12:
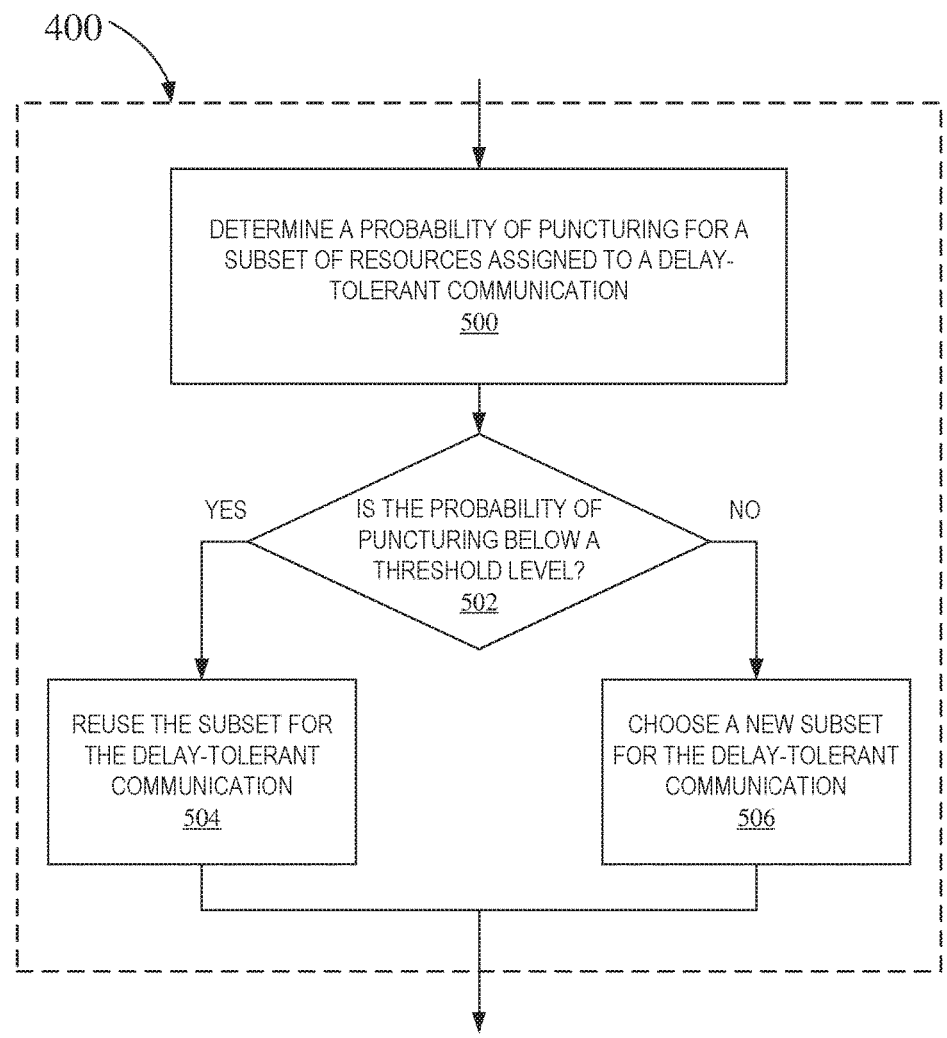
FIG. 12 is a flow chart that illustrates a method of reuse of subsets of resources assigned to a delay-tolerant communication according to some embodiments of the present disclosure.

FIG. 12 is a flow chart that illustrates a method of reuse of subsets of resources assigned to a delay-tolerant communication according to some embodiments of the present disclosure. In the embodiment illustrated in FIG. 12, additional detail about the assignment step 400 is shown. The assignment step 400 includes determining a probability that a subset of resources currently assigned to a delay-tolerant communication will be punctured (step 500). The probability of puncturing is compared to a threshold level (step 502). If the probability is below the threshold, the delay-tolerant communication reuses the subset (step 504); otherwise, a new subset is chosen for the delay-tolerant communication (step 506).

Example Embodiments

While not being limited to any particular embodiment, some example embodiments of the present disclosure are described below.

Embodiment 1

A method for scheduling and/or link adaptation (where link adaptation can include, without limitation, any combination of selection of time/frequency/spreading code/pre-coder resources, power level, aggregation and repetition level, modulation and coding level) at a transmitter comprising processing the predicted probability that one or more subsets of a set of assigned resources are actually punctured (not used for this transmission), and triggering reuse of resources by the same or other transmitters for selected (based on a certain scheme, e.g. based on importance and/or urgency level) transmissions initiated while a first transmission was still scheduled to occur based on the predicted probability.

Embodiment 2

A method for canceling the remainder of a transmission if an intended puncturing level, of an already scheduled transmission in the method of embodiment 1, is higher than what was expected, plus some margin.

Embodiment 3

The method of embodiment 1 for which newly scheduled urgent/important transmissions are assigned resources considering the desire to maintain an acceptable level of puncturing for the less urgent/important already scheduled transmissions which assigned resources may need to be puncture to make way for the new urgent/important transmissions.

Embodiment 4

In relation to embodiments 1-3, maintaining, for the scheduler, multidimensional arrays which may characterize the estimated joint probability that a resource element needs to be punctured in the future. The array may cover all scheduling dimensions (time, frequency, spreading codes, spatial pre-coders . . . ). The probability of puncturing of elements may need to be considered jointly if the probability that a resource element is reassigned to a more urgent/important transmission depends on the probability that another element has already been reassigned to this same or a different more urgent/important transmission.

Embodiment 5

A method of operation of a scheduler implemented in a network node of a cellular communications system, comprising:
    scheduling (steps 300-310) one or more delay-tolerant transmissions by one or more respective wireless devices in a subframe, wherein scheduling the one or more delay-tolerant transmissions by the one or more respective wireless devices comprises, for each wireless device:
        identifying (step 302) a plurality of available resources in a subframe;
        for each available resource of the plurality of available resources in the subframe, determining (step 304) one or more link adaptation parameters for the wireless device for the available resource based on information representing a statistical model of predicted puncturing of delay-tolerant transmissions using the available resource in order to enable transmission of delay-sensitive transmissions; and
        selecting (step 306) one of the plurality of available resources in the subframe for the delay-tolerant transmission of the wireless device based on at least one of the one or more link adaptation parameters.

Embodiment 6

The method of embodiment 5 further comprising scheduling one or more delay-sensitive transmissions by one or more respective wireless devices in the subframe.

Embodiment 7

The method of embodiment 6 wherein the plurality of available resources for scheduling the plurality of delay-tolerant transmissions do not include resources on which the delay-sensitive transmissions are scheduled in the subframe.

Embodiment 8

The method of embodiment 6 or 7 wherein scheduling the one or more delay-sensitive transmissions in the subframe comprises, for each delay-sensitive transmission to be scheduled in the subframe:
    determining (step 102) whether there are any unused resources in the subframe;
    if there are unused resources in the subframe, selecting (step 104) an unused resource as a resource for the delay-sensitive transmission by the respective wireless device; and if there are no unused resources in the sub frame, selecting (step 106) a resource already assigned to a delay-tolerant transmission as the resource for the delay-sensitive transmission.

Embodiment 9

The method of embodiment 8 wherein selecting (step 106) the resource already assigned to a delay-tolerant transmission as the resource for the delay-sensitive transmission comprises selecting one of a plurality of resources in the subframe that are already assigned to delay-tolerant transmissions as the resource for the delay-sensitive transmission based on a predefined criteria.

Embodiment 10

The method of embodiment 8 or 9 further comprising:
determining (step 110) whether a puncturing level for a resource in the subframe that is assigned to a delay-tolerant transmission is greater than a predefined threshold; and
if so, cancelling (step 112) the delay-tolerant transmission.

The following acronyms are used throughout this disclosure.
3GPP Third Generation Partnership Project
5G Fifth Generation
ASIC Application Specific Integrated Circuit
CE Coverage Enhancement
C-MTC Critical Machine-Type Communication
CPU Central Processing Unit
eNB Enhanced or Evolved Node B
FDD Frequency Division Duplex
FPGA Field Programmable Gate Array
HARQ Hybrid Automatic Repeat Request
IoT Internet of Things
LTE Long Term Evolution
MCS Modulation and Coding Scheme
MME Mobility Management Entity
M-MTC Massive Machine-Type Communication
MTC Machine-Type Communication
PBCH Physical Broadcast Channel
PDCCH Physical Downlink Control Channel
PDSCH Physical Downlink Shared Channel
P-GW Packet Data Network Gateway
PPM Puncturing Probability Matrix
PRACH Physical Random Access Channel
PUCCH Physical Uplink Control Channel
PUSCH Physical Uplink Shared Channel
RAN Radio Access Network
RB Resource Block
S-GW Serving Gateway
SINR Signal to Interference plus Noise Ratio
TDD Time Division Duplex
TTI Transmit Time Interval
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a scheduler for a network node of a cellular communications system, comprising:
scheduling one or more delay-tolerant transmissions by one or more respective wireless devices in a subframe, wherein the scheduling comprises, for each wireless device:
identifying a plurality of available resources in the subframe;
for each available resource of the identified plurality of available resources, determining one or more link adaptation parameters for the wireless device based on information representing a predicted puncturing of delay-tolerant transmissions using the available resource in order to enable transmission of delay-sensitive transmissions; and
selecting a resource from among the identified plurality of available resources in the subframe for the delay-tolerant transmission of the wireless device based on at least one of the determined one or more link adaptation parameters such that the delay-tolerant transmission of the wireless device is scheduled on the selected resource using the determined one or more link adaptation parameters.

2. The method of claim 1 further comprising scheduling one or more delay-sensitive transmissions by the one or more respective wireless devices in the subframe.

3. The method of claim 2 wherein the plurality of available resources for scheduling the one or more delay-tolerant transmissions does not include resources on which the delay-sensitive transmissions are scheduled in the subframe.

4. The method of claim 2 wherein scheduling the one or more delay-sensitive transmissions in the subframe comprises, for each delay-sensitive transmission to be scheduled in the subframe:
determining whether there are any unused resources in the subframe;
if there are unused resources in the subframe, selecting an unused resource as a resource for the delay-sensitive transmission by the respective wireless device; and
if there are no unused resources in the subframe, selecting a resource already assigned to a delay-tolerant transmission as the resource for the delay-sensitive transmission.

5. The method of claim 4 wherein selecting the resource already assigned to the delay-tolerant transmission as the resource for the delay-sensitive transmission comprises selecting one of a plurality of resources in the subframe that are already assigned to delay-tolerant transmissions as the resource for the delay-sensitive transmission based on a predefined criteria.

6. The method of claim 4 further comprising:
determining whether a puncturing level for the resource in the subframe that is assigned to the delay-tolerant transmission is greater than a predefined threshold; and
if so, cancelling the delay-tolerant transmission.

7. A radio node for a cellular communications network, comprising:
one or more transmitters;
one or more receivers;
one or more processors; and
memory storing instructions executable by the one or more processors, whereby the radio node is operable to:
schedule one or more delay-tolerant transmissions by one or more respective wireless devices in a subframe, wherein the scheduling comprises, for each wireless device:
identifying a plurality of available resources in the subframe;

for each available resource of the identified plurality of available resources, determining one or more link adaptation parameters for the wireless device based on information representing a predicted puncturing of delay-tolerant transmissions using the available resource in order to enable transmission of delay-sensitive transmissions; and selecting a resource from among the identified plurality of available resources in the subframe for the delay-tolerant transmission of the wireless device based on at least one of the determined one or more link adaptation parameters such that the delay-tolerant transmission of the wireless device is scheduled on the selected resource using the determined one or more link adaptation parameters.

8. The radio node of claim 7 wherein, via execution of the instructions by the one or more processors, the radio node is further operable to schedule one or more delay-sensitive transmissions by the one or more respective wireless devices in the subframe.

9. The radio node of claim 8 wherein the plurality of available resources for scheduling the plurality of delay-tolerant transmissions does not include resources on which the delay-sensitive transmissions are scheduled in the subframe.

10. The radio node of claim 8 wherein scheduling the one or more delay-sensitive transmissions in the subframe comprises, for each delay-sensitive transmission to be scheduled in the subframe:

determining whether there are any unused resources in the subframe;

if there are unused resources in the subframe, selecting an unused resource as a resource for the delay-sensitive transmission by the respective wireless device; and if there are no unused resources in the subframe, selecting a resource already assigned to the delay-tolerant transmission as the resource for the delay-sensitive transmission.

11. The radio node of claim 10 wherein selecting the resource already assigned to the delay-tolerant transmission as the resource for the delay-sensitive transmission comprises selecting one of a plurality of resources in the subframe that are already assigned to the delay-tolerant transmissions as the resource for the delay-sensitive transmission based on a predefined criteria.

12. The radio node of claim 10 wherein, via execution of instructions by the one or more processors, the radio node is further operable to:

determine whether a puncturing level for a resource in the subframe that is assigned to the delay-tolerant transmission is greater than a predefined threshold; and if so, cancel the delay-tolerant transmission.

13. A non-transitory computer readable medium storing software instructions that when executed by one or more processors of a radio node cause the radio node to:

schedule one or more delay-tolerant transmissions by one or more respective wireless devices in a subframe, wherein the scheduling comprises, for each wireless device:

identify a plurality of available resources in the subframe;

for each available resource of the identified plurality of available resources, determine one or more link adaptation parameters for the wireless device based on information representing a predicted puncturing of delay-tolerant transmissions using the available resource in order to enable transmission of delay-sensitive transmissions; and select a resource from among the identified plurality of available resources in the subframe for the delay-tolerant transmission of the wireless device based on at least one of the determined one or more link adaptation parameters such that the delay-tolerant transmission of the wireless device is scheduled on the selected resource using the determined one or more link adaptation parameters.

14. A method for scheduling and/or link adaptation at a transmitter, the method comprising:

assigning, from a set of communication resources in a communications subframe, at least one subset of resources for use by respective delay-tolerant communications; and for each of the at least one subset of resources:

determining a respective probability of puncturing, wherein the probability of puncturing comprises a probability that the subset of resources may be punctured by a delay-sensitive communication; and modifying the link adaptation for the respective delay-tolerant communication based on the determined probability of puncturing.

15. The method of claim 14 comprising triggering reuse of a subset of resources by the respective delay-tolerant communication to which it is assigned if the probability of puncturing is below a threshold level.

16. The method of claim 14 wherein determining the probability that the subset of resources may be punctured comprises determining a predicted number of puncturing events for that subset of resources.

17. The method of claim 14 wherein determining the probability comprises determining a probability based on at least one of:

historical data;
predicted future data;
identified short term or long term trends; and
predicted short term or long term trends.

18. The method of claim 14 comprising, for each subset of resources, maintaining information related to actual puncturing events.

19. The method of claim 18 wherein the maintained information is used during selection of a subset of resources for puncturing.

20. The method of claim 18 comprising determining a ratio of the actual number of puncturing events to the predicted number of puncturing events.

21. The method of claim 20 wherein using the determined ratios to select the subset of resources for puncturing comprises selecting for puncturing a subset of resources having a lowest ratio.

22. The method of claim 20 comprising determining whether a ratio for a subset of resources exceeds a threshold value, and, in response to that determination:

cancelling the respective delay-tolerant communication associated with that subset of resources; and identifying that subset of resources as available for puncturing.

23. The method of claim 14 wherein modifying the link adaptation comprises at least one of:

selecting a time and/or frequency;
selecting precoder resources;
setting a spreading code;
setting a repetition level;
setting a power level;
setting an aggregation level;
setting a modulation level; and
setting an encoding level.

24. A radio node for a cellular communications network, comprising:
- one or more transmitters;
- one or more receivers;
- one or more processors; and
- memory storing instructions executable by the one or more processors, whereby the radio node is operable to:
  - assign, from a set of communication resources in a communications subframe, at least one subset of resources for use by respective delay-tolerant communications; and
  - for each of the at least one subset of resources:
    - determine a respective probability of puncturing, wherein the probability of puncturing comprises a probability that the subset of resources may be punctured by a delay-sensitive communication; and
    - modify a link adaptation for the respective delay-tolerant communication based on the determined probability of puncturing.

25. The radio node of claim 24 wherein, via execution of instructions by the one or more processors, the radio node is further operable to trigger reuse of a subset of resources by the respective delay-tolerant communication to which it is assigned if the probability of puncturing is below a threshold level.

26. The radio node of claim 24 wherein determining the respective probability that the subset of resources may be punctured comprises determining a predicted number of puncturing events for that subset of resources.

27. The radio node of claim 24 wherein determining the probability comprises determining a probability based on at least one of:
- historical data;
- predicted future data;
- identified short term or long term trends; and
- predicted short term or long term trends.

28. The radio node of claim 24 wherein, via execution of the instructions by the one or more processors, the radio node is further operable to maintain, for each subset of resources, information related to actual puncturing events.

29. The radio node of claim 28 wherein the maintained information is used during selection of a subset of resources for puncturing.

30. The radio node of claim 28 wherein, via execution of the instructions by the one or more processors, the radio node is further operable to determine a ratio of the actual number of puncturing events to the predicted number of puncturing events.

31. The radio node of claim 30 wherein using the determined ratios to select the subset of resources for puncturing comprises selecting a subset of resources having the lowest ratio.

32. The radio node of claim 30 wherein, via execution of the instructions by the one or more processors, the radio node is further operable to determine whether a ratio for a subset of resources exceeds a threshold value, and, in response to the determination, cancel the respective delay-tolerant communication associated with that subset of resources, and identify that subset of resources as available for puncturing.

33. The radio node of claim 24 wherein modifying the link adaptation comprises at least one of:
- selecting a time and/or frequency;
- selecting precoder resources;
- setting a spreading code;
- setting a repetition level;
- setting a power level;
- setting an aggregation level;
- setting a modulation level; and
- setting an encoding level.

34. A non-transitory computer readable medium storing software instructions that when executed by one or more processors of a radio node cause the radio node to:
- assign, from a set of communication resources in a communications subframe, at least one subset of resources for use by respective delay-tolerant communications; and
- for each of the at least one subset of resources:
  - determine a respective probability of puncturing, wherein the probability of puncturing comprises a probability that the subset of resources may be punctured by a delay-sensitive communication; and
  - modify a link adaptation for the respective delay-tolerant communication based on the determined probability of puncturing.

* * * * *